US009464608B2

(12) United States Patent
Cho et al.

(10) Patent No.: US 9,464,608 B2
(45) Date of Patent: Oct. 11, 2016

(54) AIR CLEANER FOR VEHICLES

(71) Applicants: Hyundai Motor Company, Seoul (KR); Kia Motors Corp., Seoul (KR); LEEHAN Corporation, Suwon-si (KR)

(72) Inventors: Cheong Yong Cho, Siheung-si (KR); Byeong Kook Han, Suwon-si (KR); Sang Cheol Baek, Whasung-Si (KR); Jung Wu Jung, Whasung-Si (KR)

(73) Assignees: Hyundai Motor Company, Seoul (KR); Kia Motors Corp., Seoul (KR); LEEHAN Corporation, Suwon-si (KR)

( * ) Notice: Subject to any disclaimer, the term of this patent is extended or adjusted under 35 U.S.C. 154(b) by 82 days.

(21) Appl. No.: 14/459,243

(22) Filed: Aug. 13, 2014

(65) Prior Publication Data

US 2015/0052859 A1 Feb. 26, 2015

(30) Foreign Application Priority Data

Aug. 20, 2013 (KR) ........................ 10-2013-0098431

(51) Int. Cl.

*B01D 46/00* (2006.01)
*F02M 35/02* (2006.01)
*F02M 35/14* (2006.01)
*F02M 35/024* (2006.01)
*F02M 35/12* (2006.01)

(52) U.S. Cl.

CPC ......... *F02M 35/14* (2013.01); *F02M 35/0201* (2013.01); *F02M 35/0203* (2013.01); *F02M 35/02425* (2013.01); *F02M 35/1222* (2013.01)

(58) Field of Classification Search

CPC .. B01D 46/00; B01D 46/0006; F02M 35/02; F02M 35/0201; F02M 35/0203; F02M 35/02491

USPC ..................... 55/385.3, 481, 506; 123/198 E

See application file for complete search history.

(56) References Cited

U.S. PATENT DOCUMENTS 6,174,343 B1 * 1/2001 Bloomer ............ B01D 46/0002 123/198 E
6,217,627 B1 * 4/2001 Vyskocil ............ B01D 46/0005 123/198 E (Continued)

FOREIGN PATENT DOCUMENTS

JP 5-272419 A 10/1993
KR 10-2005-0104066 A 11/2005
KR 10-2009-0050165 A 5/2009
KR 10-2013-0061599 A 6/2013

*Primary Examiner* — Jacob T Minskey
*Assistant Examiner* — Minh-Chau Pham
(74) *Attorney, Agent, or Firm* — Morgan, Lewis & Bockius LLP

(57) ABSTRACT

A vehicular air cleaner may include: a body having an air inlet port; a cover coupled to a body and having an air outlet port; an element inserted into or drawn from the body and the cover through a access port formed in one side of the body and the cover; a positioning assembly rotatably coupled to a lower portion of the element and vertically moving the element by rotation; and an element cover coupled to the body and the cover to prevent the element from being separated from the access port, wherein the positioning assembly includes driving shafts each fitted with fixing brackets formed on a flange along a side direction of the element, and a driven shaft fitted with a fixing bracket formed on a flange along a front side of the element and having ends rotatably engaged with a pair of driving shafts.

7 Claims, 12 Drawing Sheets

(56) References Cited

U.S. PATENT DOCUMENTS

| | | | | |
|---|---|---|---|---|
| 9,169,811 | B2 * | 10/2015 | Cho | F02M 35/0201 |
| 9,169,811 | B2 * | 10/2015 | Cho | F02M 35/0201 |
| 9,255,555 | B2 * | 2/2016 | Cho | F02M 35/0201 |
| 2002/0017283 | A1 * | 2/2002 | Furuya | F01M 13/022<br>123/573 |
| 2003/0029143 | A1 * | 2/2003 | Arden | H02M 23/04<br>55/312 |
| 2008/0110146 | A1 | 5/2008 | Germain et al. | |

* cited by examiner

AIR CLEANER FOR VEHICLES

CROSS REFERENCE TO RELATED APPLICATION

The present application claims priority of Korean Patent Application Number 10-2013-0098431 filed Aug. 20, 2013, the entire contents of which application is incorporated herein for all purposes by this reference.

BACKGROUND OF INVENTION

1. Field of Invention

The present invention relates to an air cleaner for vehicles, and more particularly, to an air cleaner for vehicles capable of allowing elements installed in the air cleaner to be assembled in a drawer type and preventing the elements from being shaken by a flow pressure of air flowing in the air cleaner.

2. Description of Related Art

In general, a vehicle generates power while fuel and air are mixed and burned. That is, the fuel stored in a fuel tank of the vehicle passes through a variety of fuel supplying apparatuses and is mixed with the air introduced from the outside to thereby be injected into a cylinder of an engine, and at the same time, the engine is operated by repeating an intake stroke, a compression stroke, and an explosion stroke, and an exhaust stroke. As a result, the vehicle obtains the power.

As such, a predetermined amount of air is necessary to drive the engine and the air is introduced from the outside of the vehicle. That is, the air outside of the vehicle is introduced into a housing of an air cleaner, is moved to an intake manifold through an intake hose connected to the housing of the air cleaner, and is supplied to the engine.

That is, the intake manifold, which is formed to allow the air introduced from the outside to pass through a filter and exit toward an opposite direction, having the air cleaner therebetween, filters dust and impurities contained in the air using the filter and then supplies the filtered air to the engine to thereby supply the air necessary to perform a combustion operation.

FIG. 1 is a view schematically showing an air cleaner 1 according to the related art. Referring to FIG. 1, the air cleaner 1 according to the related art includes a body 10 having an air inlet port 12 formed at one side thereof, a cover 20 coupled to an upper portion of the body 10 and having an outlet port 22 formed at one side thereof, and an element 30 interposed between the body 10 and the cover 20.

In the air cleaner 1 having the configuration as described above, the air is introduced into the air cleaner 1 through the air inlet port 12 formed in the body 10 and the introduced air passes through the element 30 to filter the impurities and is supplied to the engine through the outlet port 22 formed in the cover 20.

Since the above-mentioned air cleaner 1 has a large amount of impurities absorbed in the element 30 in the case in which it is used long term, it may not properly perform a filtering function. Therefore, after a predetermined time is elapsed, the element 30 installed in the body 10 and the cover 20 should be replaced with a new element to filter the air.

However, the air cleaner 1 according to the related art has the body 10 and the cover 20 coupled to each other by bolts. Therefore, because the element 30 needs to be replaced after the bolts fixing four corners of the body 10 and the cover 20 are removed, a replacement work is inconvenient and a lot of time is spent to perform the replacement.

In addition, since the air cleaner 1 according to the related art has a configuration in which the element 30 is simply put on an upper side of the body 10, in the case in which the air is introduced through a lower portion of the element 30, that is, the air inlet port 12 of the body 10, the element 30 collides with the body 10 and the cover 20 while being shaken by a flow pressure of the air, thereby causing a vibrating sound.

There is a conventional patent application filed by the present applicant providing any solution to solve the problems according to the related art as described above. However, the technology disclosed in the above-mentioned patent document has an advantage that the air cleaner 1 may be easily and simply replaced because it is removably installed in a drawer type in the housing of the air cleaner, but there is a problem in that the vibrating sound is generated because the element is not firmly fixed when the flow pressure is generated in an inner side of the housing.

Therefore, the present applicant has devised an air cleaner for vehicles capable of solving the problems according to the related art as described above.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an air cleaner for vehicles capable of easily and simply replacing an element installed in the air cleaner and preventing the element from being shaken even in the case in which a flow pressure is generated in the air cleaner to block a generation of a vibrating sound by completely bringing the element into contact with a body and a cover of the air cleaner.

Various aspects of the present invention provide for an air cleaner for vehicles capable of allowing the body and the cover of the air cleaner to be firmly coupled to each other.

Various aspects of the present invention provide for an air cleaner for vehicles including: a body having an air inlet port formed in one side thereof to intake air; a cover coupled to an upper portion of the body and having an air outlet port formed in one side thereof; an element inserted into or drawn from the body and the cover through an access port formed in one side of the body and the cover; a positioning assembly rotatably coupled to a lower portion of the element and vertically elevating and descending the element according to a rotation; and an element cover coupled to an opened access port of the body and the cover to thereby prevent the element from being separated from the access port, wherein the positioning assembly includes: driving shafts each fitted with fixing brackets formed at a lower portion of a flange of both sides in a side direction of the element, and a driven shaft fitted with a fixing bracket formed at a lower portion of a flange of a front side of the element and having both ends rotatably engaged with a pair of driving shafts.

The driving shaft may be formed in a shaft shape, have a handle provided to one end thereof to allow a user to grab and rotate the handle, have a bevel gear installed at the other end thereof, and have a plurality of eccentric cams installed along a length direction.

The plurality of eccentric cams may be formed to have a diameter wider than that of the shaft and have one side formed to be protruded in one direction, wherein the protruded one side may be provided with a stopper surface forming an right angle by an upper surface and a side and a lower surface may be formed to be rounded.

The plurality of eccentric cams may have one side formed to be protruded in one direction and have a rotation limit protrusion formed to be protruded on the other side.

The element cover may include: a cover member formed in a plate shape to prevent the element inserted into the access port from being exposed to the outside, and locking members protruding from both sides in a side direction of the cover member and fixedly coupled to the access port formed in the body and the cover.

The locking members may include: a locking pin protruding from both sides of the cover member and having a constraint protrusion formed thereon having one end inserted into the access port to thereby be fitted with a constraint hole formed to penetrate through the side, and a releasing pin having a releasing protrusion formed thereon having one end coupled to an outer side of the access port to thereby release a constraint of the locking pin having one end inserted into the constraint hole.

The element cover may further include a coupling limit member allowing the cover member to be coupled to or not to be coupled to the body and the cover according to a rotation position of the positioning assembly.

The element cover may further include a supporting roller including a supporting bracket protruding from one surface of the cover member and rotatably installed in the supporting bracket to thereby support a lower portion of a flange of the element elevated by a rotation of the positioning assembly.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
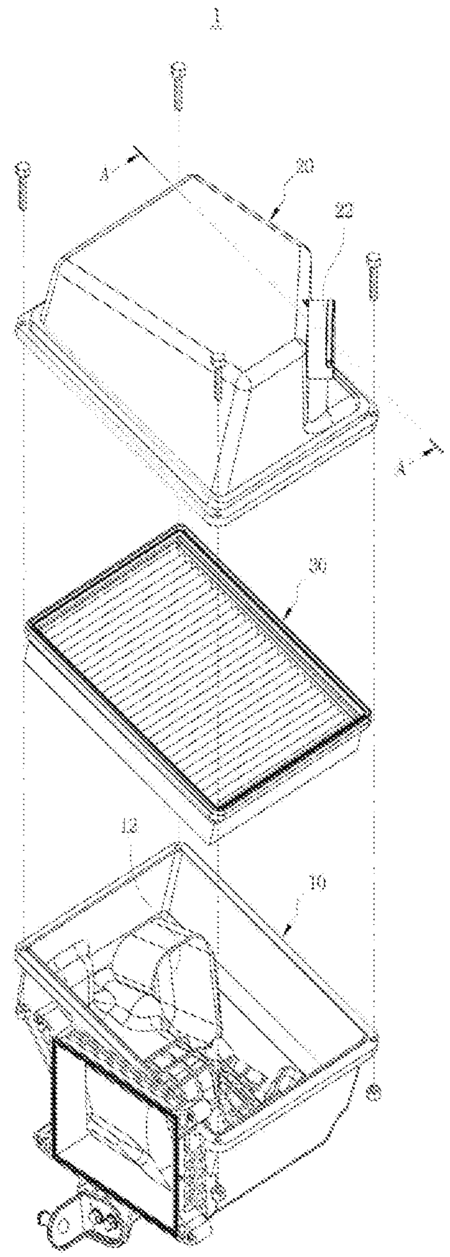
FIG. 1 (Related Art)
FIG. 1 is a view schematically showing a drawer type air cleaner for vehicles according to the related art.
Figure 2:
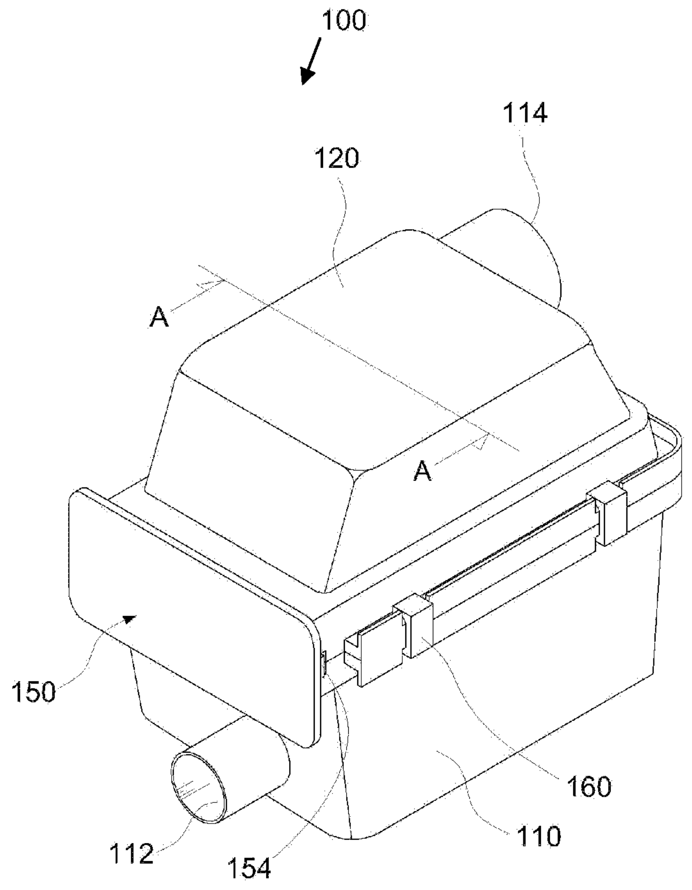
FIG. 2 is a view schematically showing an exemplary air cleaner for vehicles according to the present invention.
Figure 3:
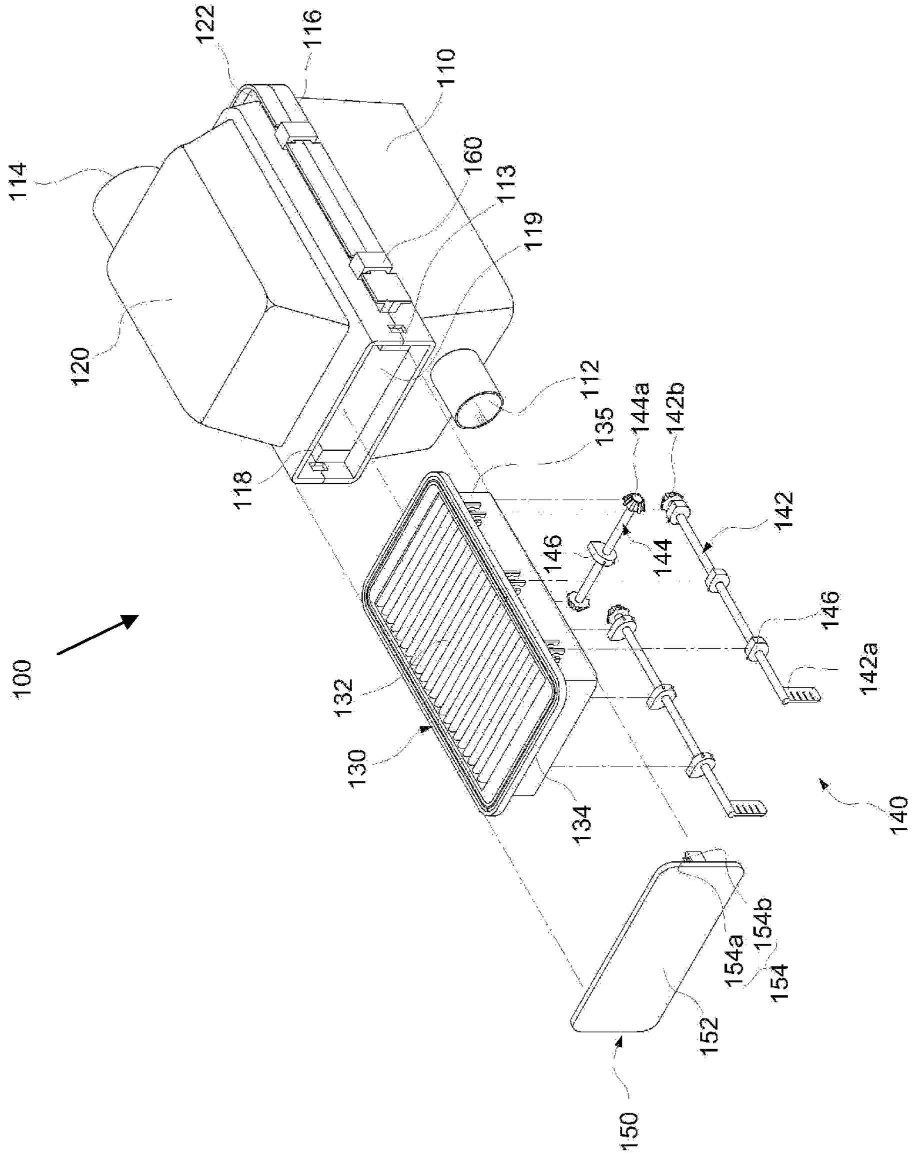
FIG. 3 is an exploded perspective view of the air cleaner of FIG. 2.

FIG. 2 is a view schematically showing an air cleaner for vehicles according to various embodiments of the present invention and FIG. 3 is an exploded perspective view of the air cleaner for vehicles according to various embodiments of the present invention.

Referring to FIGS. 2 and 3, an air cleaner 100 for vehicles according to various embodiments of the present invention may include a body 110 having an air inlet port 112 formed in one side thereof to intake an air, a cover 120 coupled to an upper portion of the body 110 forming a filter chamber 102 and having an air outlet port 114 in one side thereof, an element 130 installed in the body 110 and the cover 120 to filter the air, a closely adhering assembly or positioning assembly 140 removably installed on a lower portion of the element 130 and allowing an upper side of the element 130 and a lower side of the cover 120 to be closely adhered or positioned to abut against each other according to a rotation of the positioning assembly, and an element cover 150 installed on one side of a side of the cover 120. While the term “closely adhering” has been used to describe how element 130 may stick or become fixed in place with respect to the cover 120, one will appreciate that an adhesive is not necessarily used to facilitate such sticking or fixing in place.

Specifically, as shown in the drawings, the body 110 may be formed in an enclosure shape in which an accommodation space is formed, may be formed so that the upper portion thereof is opened, and may have the air inlet port 112 formed in one side thereof to introduce an external air.

In addition, the body 110 may be provided with a seating jaw 116 laterally extended along an outer edge of the opened upper end and may have a supporting jaw 118 formed in an inner side thereof along the edge.

The cover 120, which is coupled to the opened upper side of the body 110, may be formed in the enclosure shape in which the accommodation space is formed similar to the body 110, may be formed so that the lower portion thereof is opened, and may have the air outlet port 114 formed in one side thereof to discharge the air introduced through the air inlet port 112 to the outside.

In addition, a coupling jaw 122 laterally extended along the outer edge to be seated on the seating jaw 116 formed in the body 110 may be formed on an opened lower end of the cover 120.

In this case, one side of a portion in which the seating jaw 116 and the coupling jaw 122 of the body 110 and the cover 120 are in contact with each other may be provided with an access or installation port 119 that the element 130 capable of filtering the air when the body 110 and the cover 120 are in contact with each other is inserted or drawn.

That is, the access port 119 may be formed to have a shape corresponding to the element 130 and may be formed so that the element 130 is inserted into or drawn from an inner side of the body 110 and the cover 120 in the drawer type through the access port 119.

Meanwhile, the element 130 has various kinds such as a dry type using a filtering paper or a synthetic fiber, a wet type using an engine, a water, or the like, a complex type incorporating the wet type and the dry type, and the like, but according to various embodiments of the present invention, impurities in the air introduced into the air cleaner 100 may be filtered while passing through the element 130 by a negative pressure of the engine by using the dry type.

Specifically, the element 130 may include a filtering paper 132 capable of filtering the impurities contained in the air, and an edge member 134 formed over the filtering paper 132 and formed to surround an outer periphery surface of the filtering paper 132 to prevent a shape of the filtering paper 132 from being modified by the flow pressure of the air.

The filtering paper 132 may be made of a synthetic fiber material and stacked in a multi-step, thereby having a sufficient filtering area.

In addition, the edge member 134 formed to surround an outer peripheral surface of the filtering paper 132 is formed by a frame of a rectangular shape and has a flange formed on an upper side thereof to be laterally extended and protruded.

In this case, according to various embodiments of the present invention, a plurality of fixing brackets 135 may be formed on a lower portion of the flange to be downwardly protruded.

The plurality of fixing brackets 135 are formed to be rotatable by having one end integrally fixed coupled to the flange and the other end fitted with a positioning assembly 140 to be described below, wherein a pair of two fixing brackets 135 is spaced apart from by a predetermined interval and a plurality of pair of fixing brackets 135 are formed along a length direction of the flange. One will appreciate that such integral components may be monolithically formed.

Figure 4:
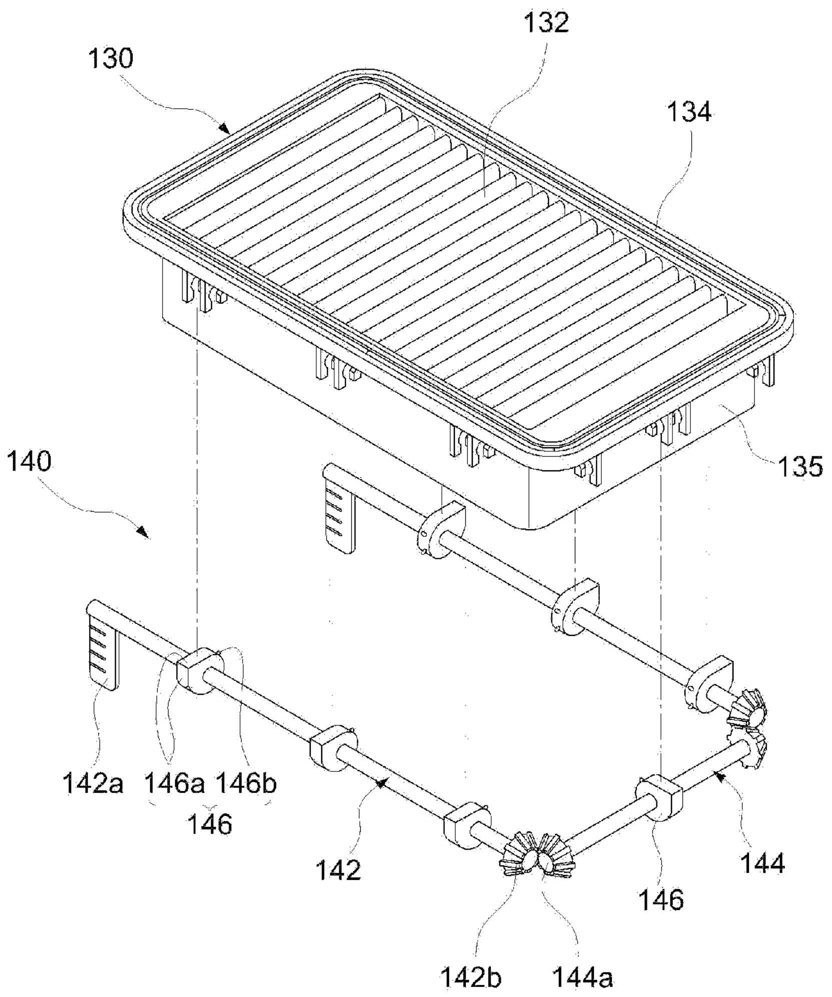
FIG. 4 is a view schematically showing a front of an exemplary element of the air cleaner of FIG. 2 including an eccentric cam of an exemplary positioning assembly according to the present invention.

Meanwhile, the positioning assembly 140 fitted with the fixing bracket 135, which has a configuration in which the cam is supported by the supporting jaw 118 formed in the body 110 while being rotated according to a rotation to allow the element 130 to be upwardly elevated, may include driving shafts 142 each fitted with the fixing brackets 135 disposed on the lower portion of the flange of both sides of a side direction of the element 130 and a driven shaft 144 fitted with the fixing bracket 135 disposed on the lower portion of the flange of a front side of the element 130 and having both ends rotatably coupled between the pair of driving shafts 142, as shown in FIGS. 3 and 4.

One end of the driving shaft 142 is provided with a handle 142*a* to enable a user to grab and rotate the driving shaft 142 and the other end thereof is installed with a bevel gear 142*b*. In this case, a plurality of eccentric cams 146 are installed on the driving shaft 142 along the length direction.

In addition, the driven shaft 144 has a structure in which bevel gears 144*a* are provided to both ends and the eccentric cam 146 is installed at a center of a shaft which is provided with the bevel gears 144*a*.

Here, the eccentric cams 146 formed on the driving shaft 142 and the driven shaft 144 are formed to have a diameter larger than a shaft diameter of the driving shaft 142 and the driven shaft 144 and formed to have an extended one side. In the case in which the user rotates the driving shaft 142 in a state of grabbing the handle 142*a* provided to one end of the driving shaft 142, a protruded portion of the eccentric cams 146 is downwardly directed and supported by the supporting jaw 118 formed in the body 110 to thereby serve to elevate the element.

Figure 5:
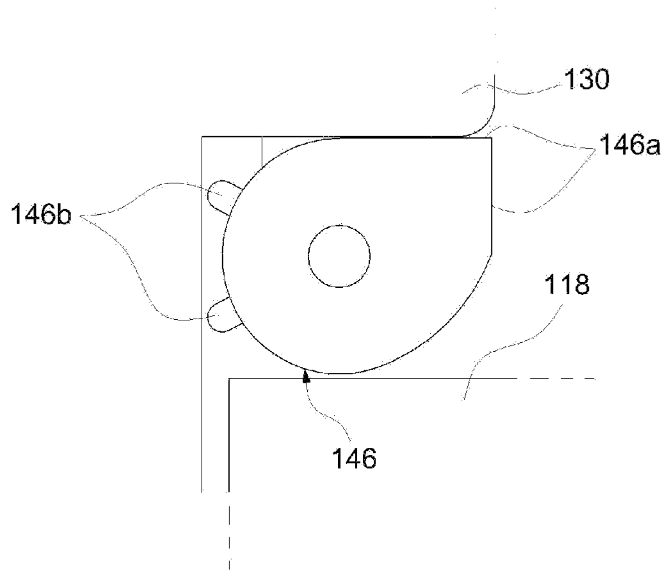
FIG. 5 is an enlarged view schematically showing the eccentric cam of FIG. 4.

In this case, as shown in FIG. 5, the eccentric cam 146 may be formed so that it is rotated in one direction by forming a right angle by an upper surface and a side of a portion protruded toward one side on the drawings to thereby form a stopper surface 146*a* and forming a lower surface to be rounded.

That is, the portion of the eccentric cam 146 protruded at the right angle may not be rotated due to the contact with the supporting jaw 118 and only the portion formed to be rounded may be rotated.

The other side of the eccentric cam 146 formed to be protruded toward one side may be provided with a rotation limit protrusion 146*b* formed to be protruded.

The rotation limit protrusion 146*b*, which is a configuration rotated only when a predetermined pressure is applied thereto in the case in which the user elevates the element 130 by rotating the driving shaft 142 and the driven shaft 144, serves to naturally limit the rotation of the driving shaft 142 and the driven shaft 144.

That is, the rotation limit protrusion 146*b* serves to allow the driving shaft 142 and the driven shaft 144 to be rotated only when the user applies artificial force thereto.

Figure 6:
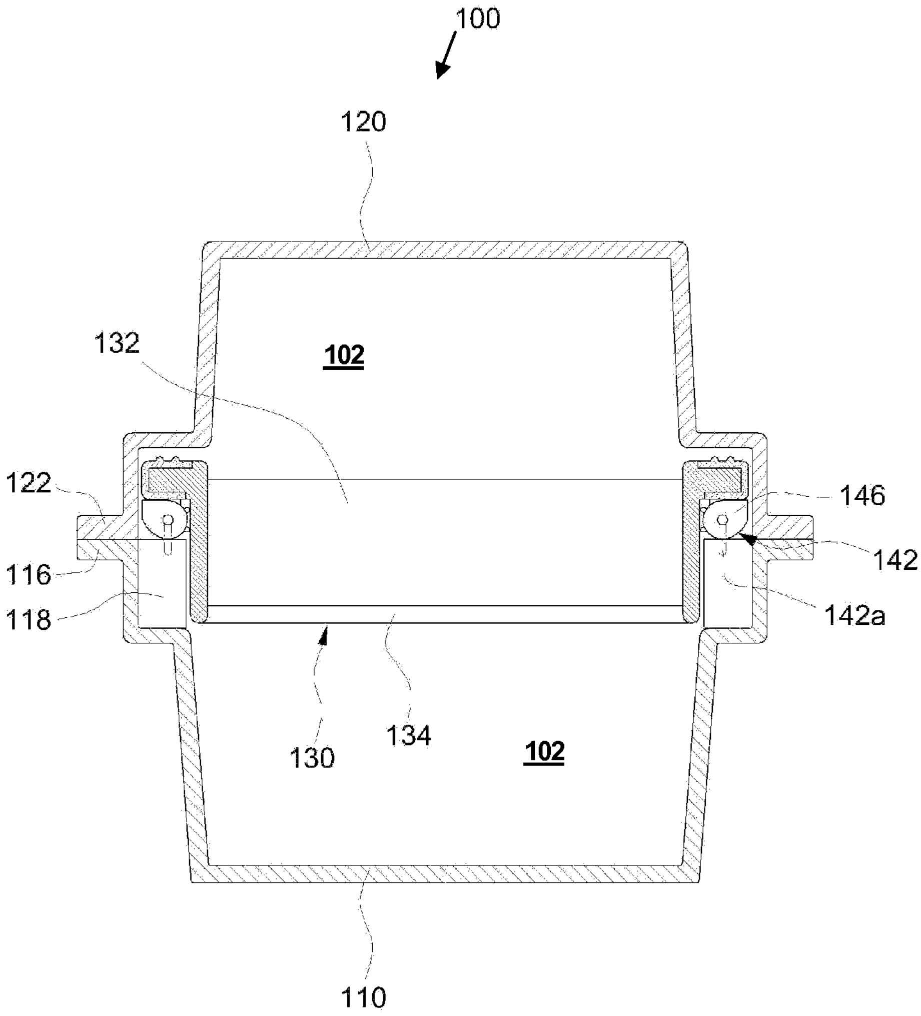
FIG. 6 is a cross-sectional view taken along line A-A of FIG. 2.
Figure 7:
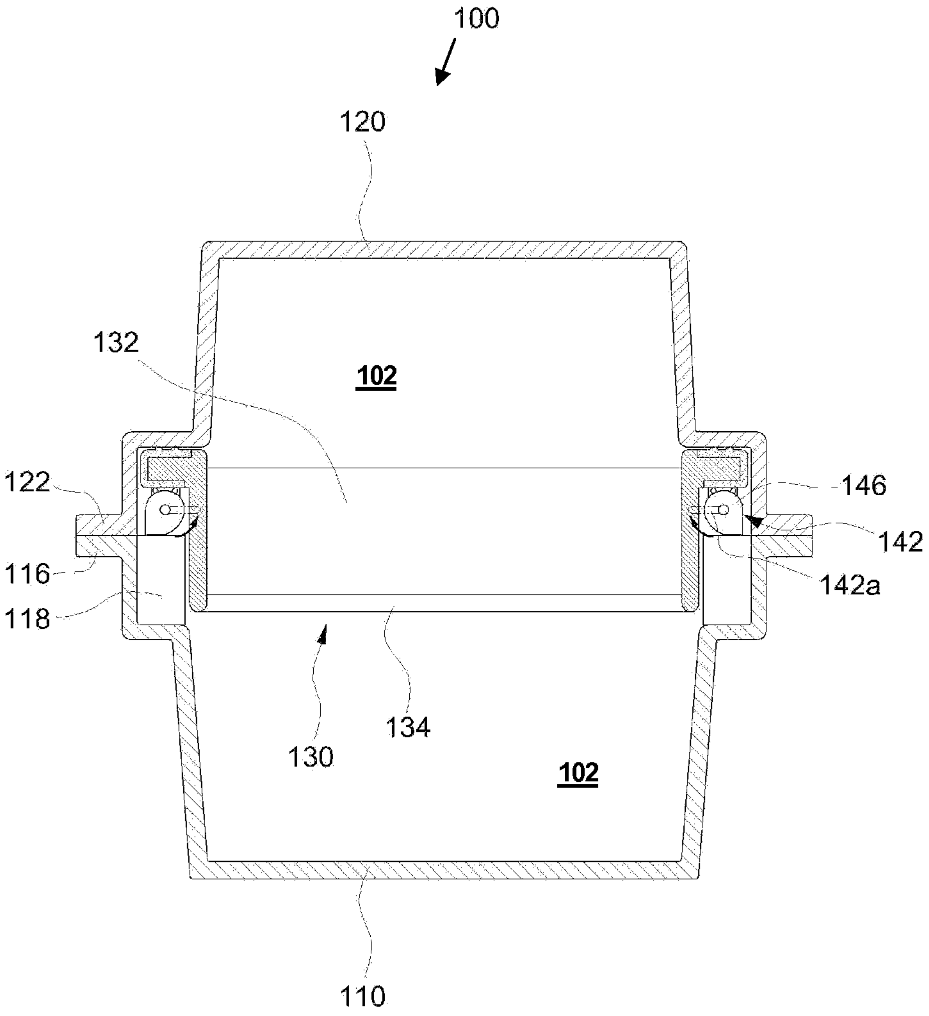
FIG. 7 is a view schematically showing an operational form of FIG. 6.

Therefore, as shown in FIG. 6, the positioning assembly 140 having the configuration as described above is initially inserted into the access port 119 formed in body 110 and the cover 120 in a state in which it is coupled to the lower portion of the flange of the element 130, it is inserted in a state in which the extended and protruded portion of the eccentric cam 146 is rotated to direct toward a horizontal direction, and after the element 130 is completely inserted, as shown in FIG. 7, the positioning assembly 140 has a structure in which it rotates the handle 142*a* to rotate the driving shaft 142 so that the extended and protruded portion of the eccentric cam 146 is downwardly directed to thereby allow the protruded portion of the eccentric cam 146 to be supported by the supporting jaw 118 formed on the body 110, such that the element 130 is closely adhered to the upper side of the access port 119 of the cover while being upwardly elevated.

In this structure, in the case in which the driving shaft 142 having the handle 142*a* provided thereto is rotated, the bevel gears 142*b* provided to the ends of the driving shaft 142 rotates the bevel gear 144*a* of the driven shaft 144 while being rotated to thereby rotate the driven shaft 144. In this case, the pair of driving shafts 142 may be simultaneously rotated, and if necessary, even in the case in which only any one of the pair of driving shafts 142 is rotated, all of the driven shaft 144 and the other driving shaft 142 may also be rotated.

Therefore, since the element 130 is closely adhered to the body 110 and cover 120 of the air cleaner by the driving of the positioning assembly 140, the element 130 is not shaken even in the case in which the flow pressure flowing in the air cleaner 100 is present, such that a vibrating sound is not generated.

In addition, since the element 130 is closely adhered to the body 110 and the cover 120, a leakage of air may be prevented, thereby making it possible to block a leakage sound from being generated.

In addition, the element 130 may be easily and simply closely adhered to the body 110 and the cover 120 by a simple operation rotating the positioning assembly 140.

Meanwhile, an outer side of the access port 119 having the element 130 inserted therein may be provided with the element cover 150.

Figure 8:
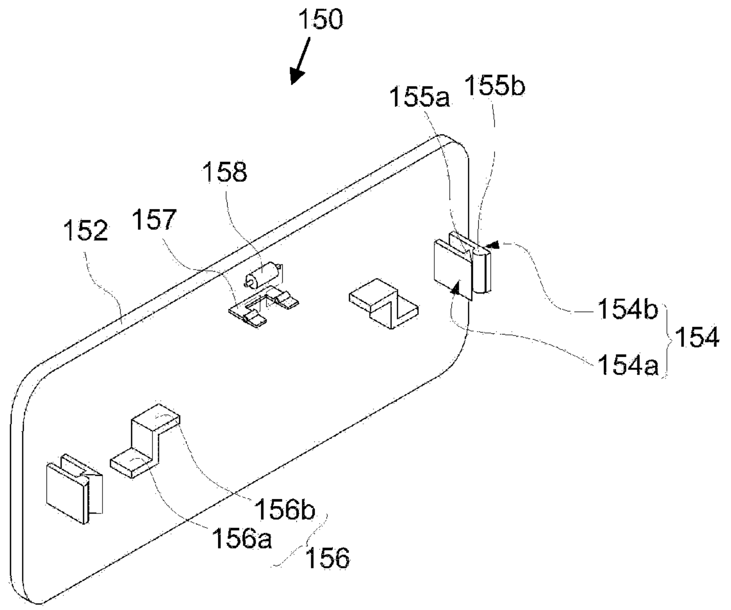
FIG. 8 is a view schematically showing an exemplary element cover that may be used with the air cleaner of FIG. 2 according to the present invention.
Figure 9A:
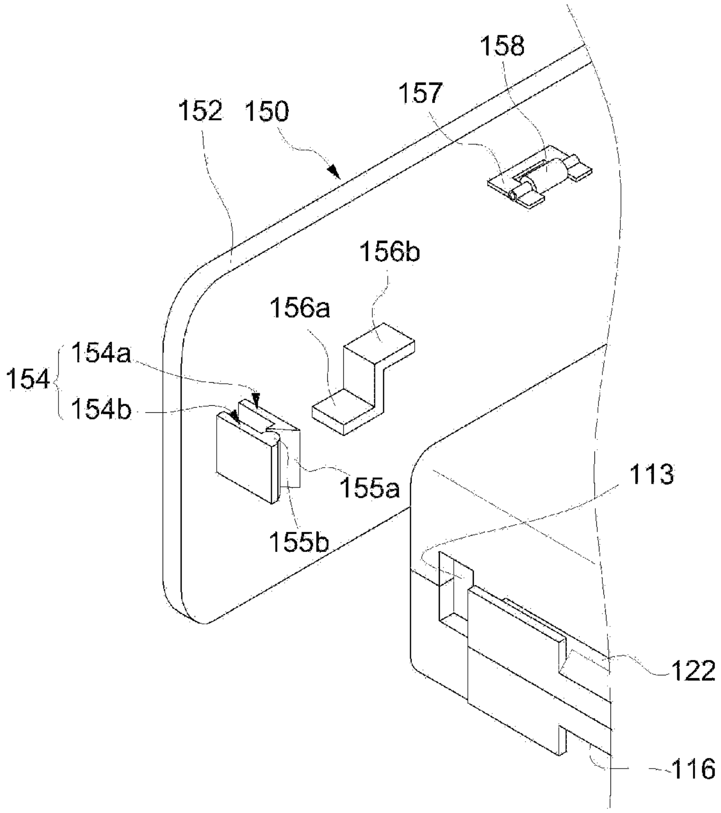
FIGS. 9A and 9B are views schematically showing a form that the element cover of FIG. 8 may be coupled or separated according to the present invention.
Figure 9B:
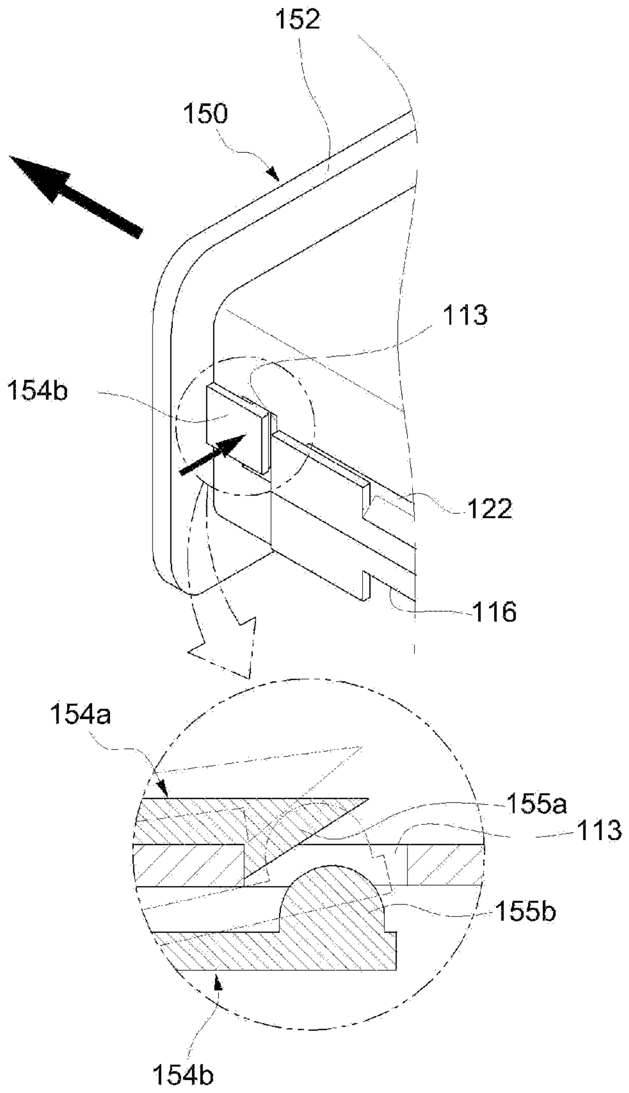

As shown in FIGS. 8 and 9B, the element cover 150 may include a cover member 152 formed in a plate shape and preventing the element 130 inserted into the access port 119 from being exposed to the outside, locking members 154 formed to be protruded from both sides in a side direction of the cover member 152 and fixed to the body 110 and the cover 120, a coupling limit member 156 allowing the cover member 152 to be coupled or not to be coupled to the body 110 and the cover 120 depending on a rotation position of the positioning assembly, and a supporting roller 158 supporting the lower portion of the flange of the element 130 elevated by the rotation of the positioning assembly 140.

Specifically, the cover member 152 may be formed to be wider than a diameter of the access port 119 to thereby completely cover the access port 119 and may have the locking member 154 having elastic force protruding from one surface thereof.

In addition, the locking members 154, which may fix the cover member 152 in a form in which a portion thereof is fitted into a constraint hole 113 formed to penetrate through a side of the access port 119 of a portion contacting the body 110 and the cover 120, may be formed in both sides of one surface of the cover member 152.

Specifically, the locking members 154 are formed on both sides of the cover member 152 to be protruded, and may include a locking pin 154*a* having one end inserted into the access port 119 and fitted with the constraint hole 113 formed to penetrate through the side to thereby prevent the cover member 152 from being separated from the access port 119, and a releasing pin 154*b* having one end disposed at an outer side of the access port 119 to release the constraint of the locking pin 154*a* having one end inserted into the constraint hole 113.

In this case, the locking pin 154*a* and the releasing pin 154*b* are installed to be spaced apart from each other by a predetermined interval and are disposed to face each other, wherein an end in a direction facing each other, that is, an end of the locking pin 154*a* includes a constraint protrusion 155*a* and an end of the releasing pin 154*b* includes a releasing protrusion 155*b* separating the locking pin 154*a* from the constraint hole 113 by pressing the constraint protrusion 155*a*.

Further, in case of the constraint protrusion 155*a* formed in the locking pin 154*a*, a caught jaw is formed on a surface contacting the constraint hole 113 so as not to be separated from the constraint hole 113, and the releasing protrusion 155*b* formed in the releasing pin 154*b* has a surface contacting the constraint hole 113, which is formed to be rounded so that it may be smoothly separated even in a state in which the constraint protrusion 155*a* is pressed from an outer side of the constraint hole 113.

Therefore, as shown in FIG. 9A, in the case in which the cover member 152 is coupled to the access port 119, both sides of the access port 119 are each fitted between the locking pin 154*a* and the releasing pin 154*b* each formed at both sides of one surface of the cover member 152, such that the cover member 152 is fixed in a form in which the constraint protrusion 155*a* of the locking pin 154*a* is fitted with the constraint hole 113.

Next, in the case in which the cover member 152 is separated from the access port 119, as shown in FIG. 9B, the releasing pin 154*b* is pressed in a direction in which the locking pin 154*a* is disposed. Therefore, in a state in which the releasing protrusion 155*b* separates the constraint protrusion 155*a* inserted into the constraint hole from the constraint hole 113, the cover member 152 is separated. In this case, since the releasing protrusion 155 has the portion contacting the constraint hole 113, which is formed to be rounded, it may be smoothly separated from the constraint hole 113 while being not caught by the constraint hole 113.

In addition, a portion having the driving shaft 142 of the positioning assembly 140 disposed thereon of the cover member 152 may be protrudedly provided with the coupling limit member 156 having a multi-step bent form.

Figure 10A:
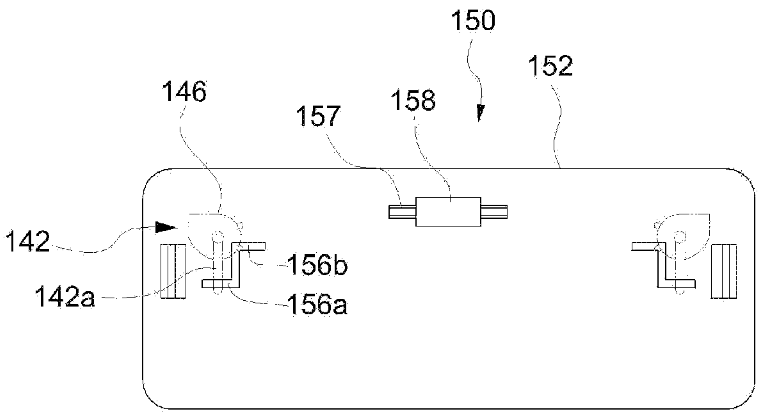
FIGS. 10A and 10B are views schematically showing forms of an exemplary coupling limit member and an exemplary driving shaft according to the present invention.

As shown in FIG. 10A, the coupling limit member 156 may include a first coupling limit jaw 156*a* limiting the cover member 152 from being coupled to the access port 119 while being in contact with the handle 142*a* of the driving shaft 142 in the case in which the handle 142*a* is downwardly disposed, that is, the protruded portion of the eccentric cam 146 is disposed in the side direction and the element 130 is not closely adhered to the cover 120, and a second coupling limit jaw 156*b* supporting the handle 142*a* of the driving shaft 142 at the lower portion so as not to be rotated after the cover member 152 is coupled to the access port 119.

Figure 10B:
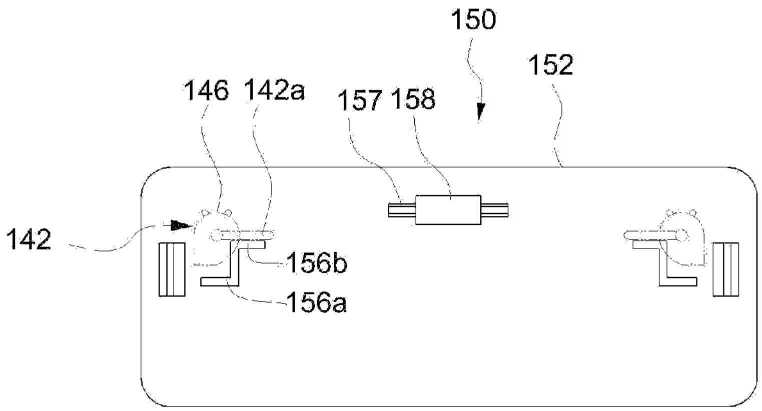

Therefore, in a state in which the element 130 is upwardly elevated by rotating the driving shaft 142 and is closely adhered to the cover 120, the cover member 152 may be coupled, but in a state in which the element 130 is downwardly disposed and is not closely adhered to the cover 120, since the first coupling limit jaw 156*a* formed in the cover member 152 is in contact with the handle 142*a*, the cover member 152 is not coupled. In addition, as shown in FIG. 10B, by providing the second coupling limit jaw 156*b* limiting the rotation of driving shaft 142 supporting the element 130, it is possible to prevent the rotation of the driving shaft 142 caused by impact.

In addition, one surface of the cover member 152 having the locking member 154 formed thereon may be provided with a supporting roller 158 capable of supporting the element 130 upwardly elevated by the positioning assembly 140 at the lower portion.

The supporting roller 158, which is rotatably coupled to the supporting bracket 157 protruding from one surface of the cover member 152, may be coupled while being slid on a bottom of the flange of the element 130 elevated by the positioning assembly 140 and may minimize the shake of the element 130 by supporting the element 130 after being coupled.

Figure 11:
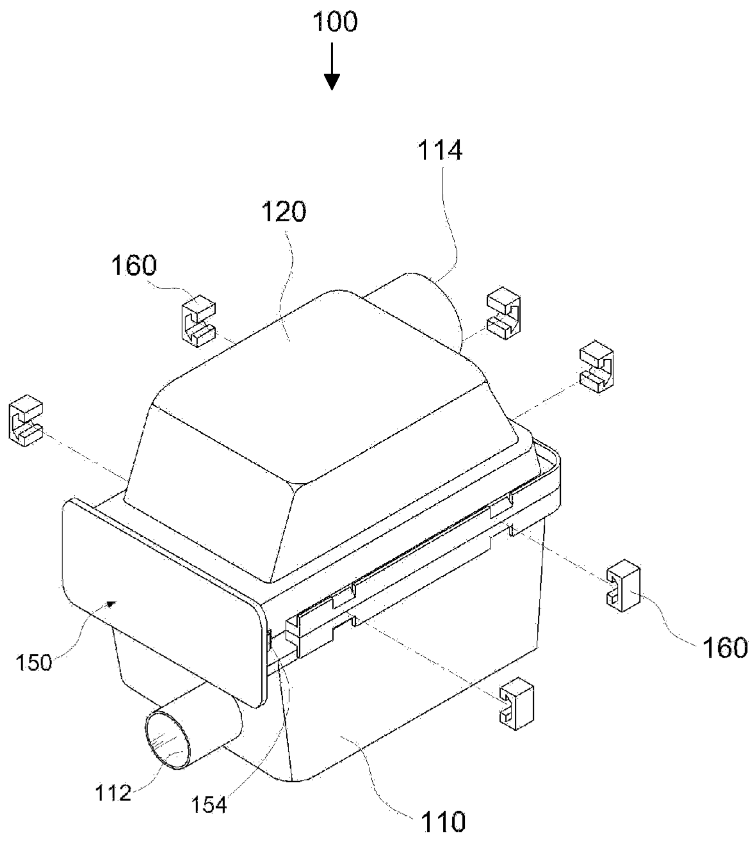
FIG. 11 is a view schematically showing a form that an exemplary clamp used that may be used with the air cleaner of FIG. 2 according to the present invention is separated.

Meanwhile, the air cleaner 100 for vehicles according to various embodiments of the present invention may have the body 110 and cover 120 fastened by a plurality of clamps 160, as shown in FIG. 11.

The clamp 160 is formed in a shape of "C" letter, has a structure in which both ends are protrudedly provided with caught jaws in a direction facing each other, and is formed of a material having elastic force, wherein a plurality of clamps 160 may be installed in the seating jaw 116 and the coupling jaw 122.

Therefore, the air cleaner for vehicles according to various embodiments of the present invention may easily and simply couple the body 110 and the cover 120 to each other, may also minimize the generation of the vibrating sound, and may simply replace the element 130.

According to various embodiments of the present invention, the element is removably installed in the drawer type in the air cleaner, such that it may be easily and simply replaced. In addition, the closely adhering unit is provided to the lower portion of the flange of the element to completely adhere the upper surface of the element and the cover to each other, such that the leakage of the air may be minimized and the generation of the vibrating sound may be prevented.

In addition, the element cover provided to insert and draw the element is easily and simply fastened to or separated from the body and the cover, such that the time spent in replacing the element may be reduced.

For convenience in explanation and accurate definition in the appended claims, the terms upper or lower, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air cleaner for vehicles, the air cleaner comprising:

a body having an air inlet port formed in one side thereof to intake air;

a cover coupled to an upper portion of the body to form a filter chamber, the cover having an air outlet port formed in one side thereof;

an element inserted into or drawn from the filter chamber through an access port formed in the body and the cover;

a positioning assembly rotatably coupled to a lower portion of the element and configured for vertically moving the element according to rotation of the positioning assembly; and an element cover coupled to the access port to enclose the element within the body and cover;

wherein the positioning assembly includes a plurality of driving shafts, each rotatably supported by respective fixing brackets formed on respective side flanges of the element extending in a side direction of the element, and a driven shaft supported by a fixing bracket formed on a front flange of the element and having opposing ends rotatably engaged with respective driving shafts, wherein each driving shaft has:

a handle on one end of the each driving shaft to allow a user to grab the handle to rotate the each driving shaft;

a bevel gear installed at an opposing end of the each driving shaft; and a plurality of eccentric cams installed on the driving shaft along a length direction of the driving shaft, and wherein driven shaft has:

bevel gears installed at both end of the driving shaft and engaged with a corresponding bevel gear of the driving shafts; and an eccentric cam installed on the driven shaft along a length direction of the driven shaft.

2. The air cleaner of claim 1, wherein at least one of the plurality of eccentric cams includes a diameter wider than that of the shaft and a first side protruding in a first direction, the protruded first side including a right-angled stopper surface and a rounded lower surface.

3. The air cleaner of claim 2, wherein at least one of the plurality of eccentric cams includes a second side opposed from said first side, and a rotation limit protrusion protruding from the second side.

4. The air cleaner of claim 1, wherein the element cover includes:

a cover member having a plate shape to prevent the element inserted into the access port from being exposed to the outside; and locking members protruding from opposing sides of the cover member in a side direction of the cover member and removably coupled to the access port formed in the body and the cover.

5. The air cleaner of claim 4, wherein the locking members include:

a locking pin protruding from opposing sides of the cover member and having a constraint protrusion formed thereon having one end inserted into the access port to thereby be fitted with a constraint hole formed to penetrate through the side; and a releasing pin having a releasing protrusion formed thereon having one end coupled to an outer side of the access port to thereby release a constraint of the locking pin having one end inserted into the constraint hole.

6. The air cleaner of claim 4, wherein the element cover further includes a coupling limit member allowing the cover member to be selectively coupled to the body and the cover according to a rotation position of the positioning assembly.

7. The air cleaner of claim 4, wherein the element cover further includes a supporting roller including a supporting bracket protruding from one surface of the cover member and rotatably installed in the supporting bracket to thereby support a lower portion of a flange of the element elevated by a rotation of the positioning assembly.

* * * * *